United States Patent [19]
Long

[11] Patent Number: 5,846,119
[45] Date of Patent: Dec. 8, 1998

[54] TURKEY CALL AND ACCESSORIES

[76] Inventor: Kenneth W. Long, P.O. Box 71, El Dorado Springs, Mo. 64744

[21] Appl. No.: 929,756

[22] Filed: Sep. 15, 1997

Related U.S. Application Data

[60] Provisional application No. 60/026,271 Sep. 18, 1996.
[51] Int. Cl.$^6$ ....................................................... A63H 5/00
[52] U.S. Cl. .......................................... 446/397; 446/404
[58] Field of Search .................................... 446/397, 398, 446/492, 494, 415, 420, 421, 188, 190, 192; 43/1, 2; 84/402, 410, 412

[56] References Cited

U.S. PATENT DOCUMENTS

| | | |
|---|---|---|
| 2,606,401 | 8/1952 | Boatwright .............................. 446/397 |
| 2,610,441 | 9/1952 | Unger ...................................... 446/397 |
| 2,642,699 | 6/1953 | Green . |
| 2,643,483 | 6/1953 | Walker .................................... 446/397 |
| 3,100,948 | 8/1963 | Tax . |
| 3,793,767 | 2/1974 | Pulley .................................... 446/397 |
| 4,041,639 | 8/1977 | Funk ...................................... 446/397 |
| 4,343,108 | 8/1982 | Lee . |
| 4,527,985 | 7/1985 | Zoschg et al. .......................... 446/397 |
| 4,648,852 | 3/1987 | Wingate . |
| 4,941,858 | 7/1990 | Adams .................................... 446/397 |
| 4,988,325 | 1/1991 | Alderson . |

Primary Examiner—Robert A. Hafer
Assistant Examiner—D. Neal Muir
Attorney, Agent, or Firm—Jonathan A. Bay

[57] ABSTRACT

A wooden box call is modified to carry a strike plate on the back face of the lid/actuator. The strike plate allows use with conventional pegs or reeds, which are scraped against the strike plate to produce a mimic turkey call different from the mimic turkey call obtainable from the box call when used conventionally. Also, the reed or peg can be partly threaded and thus be screwed into a socket in the bottom of the box call such that flipping the lid/actuator allows alternate use between the conventional way box calls are used, and the way of the fixed peg/strike plate combination. More than one peg can be screwed into the bottom of the box call in order to get resonance between them. Resonating reeds can also be achieved by a stand-alone base block to which two or more reeds are attached like tines of a tuning fork. Additionally, if given a single threaded peg and a respective base block formed with a threaded through hole, the peg can be screwed or unscrewed in the through hole to change its free length to become relatively shorter or longer. That way, a user can tune the pitch of the reed by changing its free length. Moreover, the box call can be tuned by provision and use of various vibration dampers. These vibration dampers have arms which are deployable to rest against and dampen the sidewalls or sounding boards of the box call in order to allow tuning of the box call itself.

12 Claims, 4 Drawing Sheets

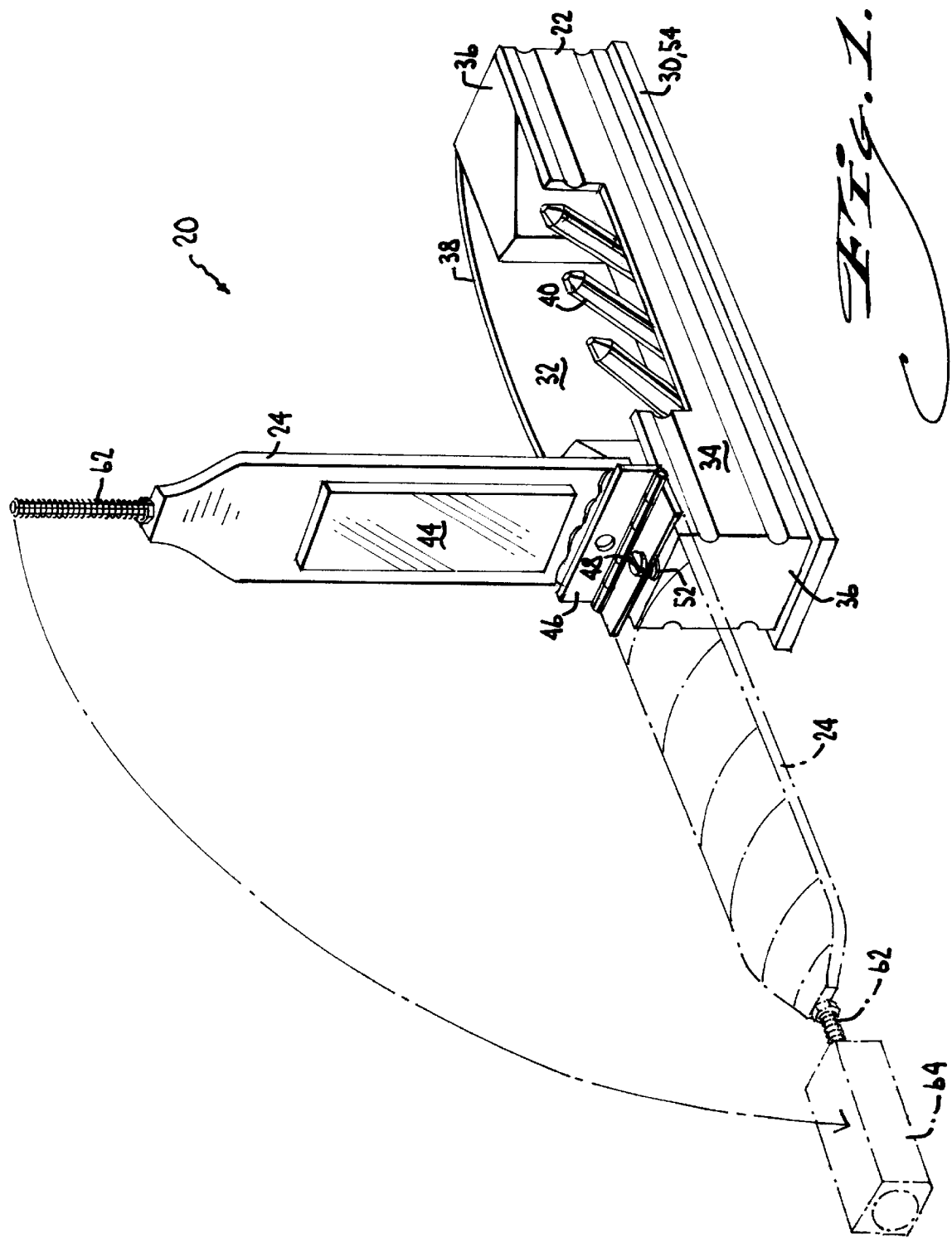

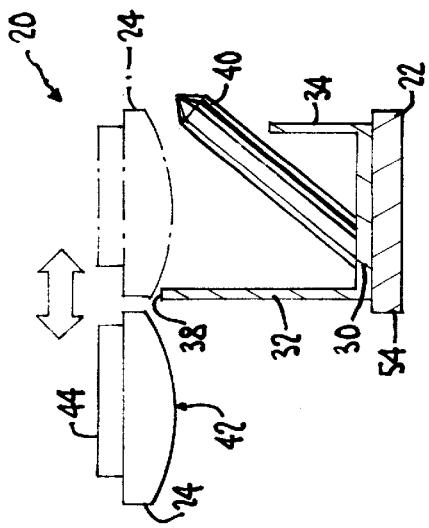
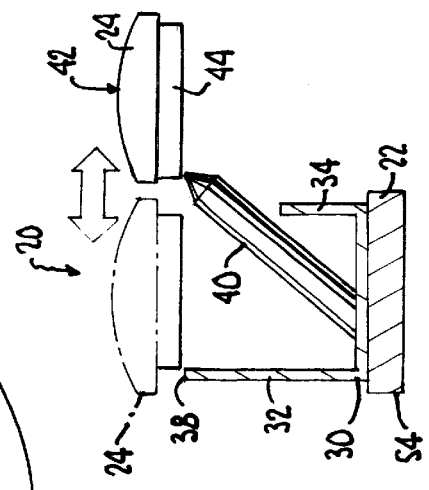
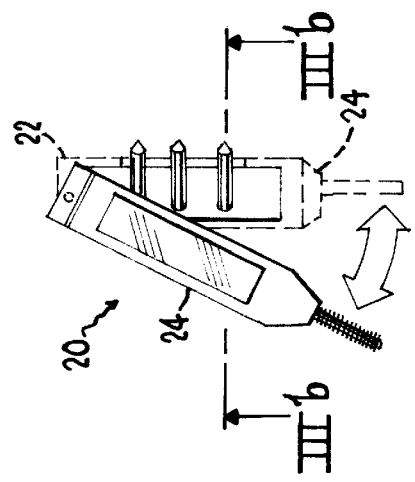
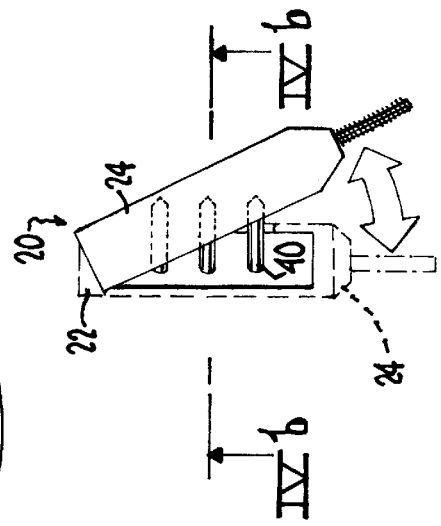
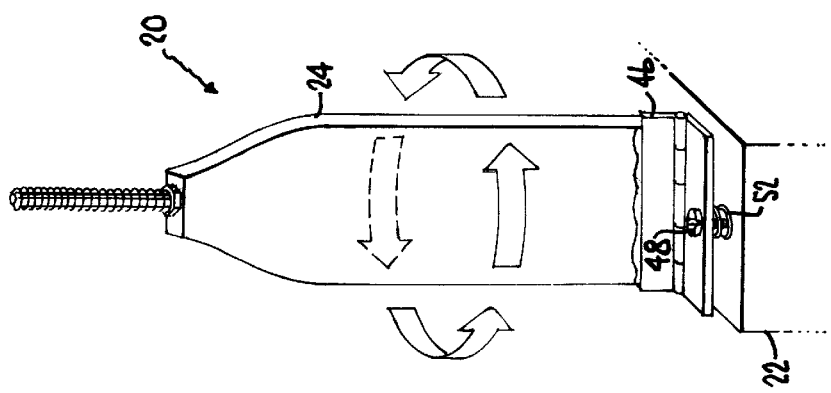

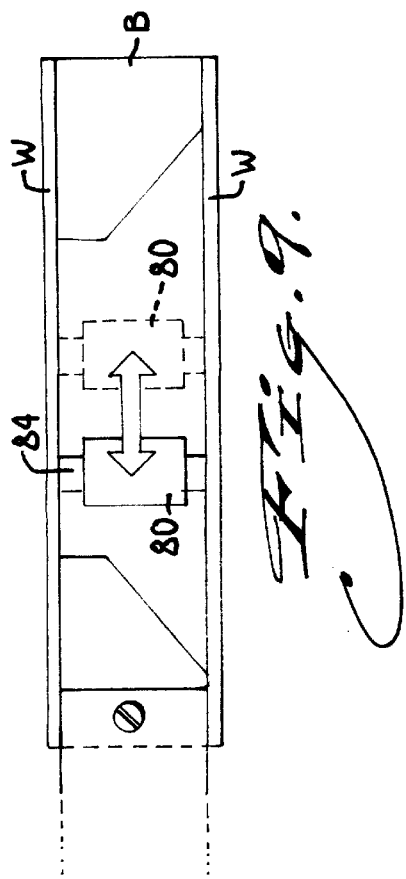
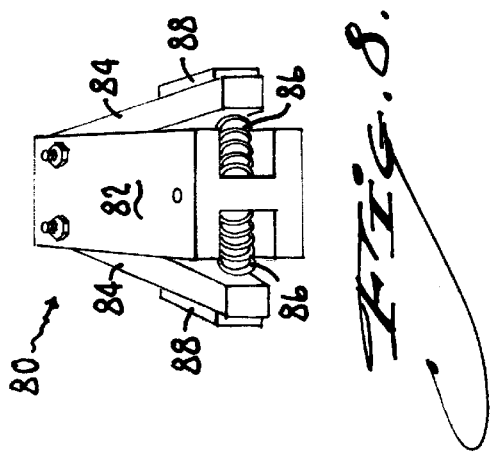
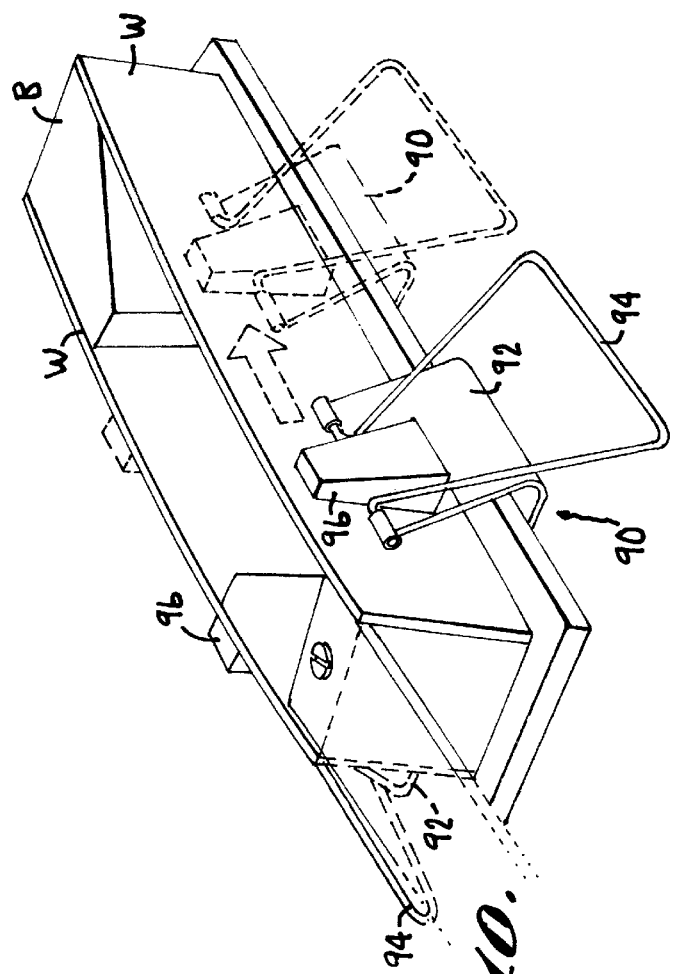

TURKEY CALL AND ACCESSORIES

CROSS-REFERENCE TO PROVISIONAL APPLICATION(S)

This application claims the benefit of U.S. Provisional application Ser. No. 60/026,271, filed Sep. 18, 1996.

BACKGROUND AND SUMMARY OF THE INVENTION

The invention generally relates to turkey calls and accessories therefor, useful by hunters, photographers and game-watchers and the like to reproduce yelps, cackles, purrs, clucks and so on, to attract wild turkeys.

Turkey call devices are used to produce mimic turkey calls in hopes of inducing a live bird to respond and approach the caller. Use of these call devices is fairly an art form. A bird is easily spooked by inartful use of a given call device. A shortcoming with the conventional call devices is that each model characteristically has one "voice" or tone or resonance that characterizes that model. If an inartful caller has spooked a bird one day with a given model, even an artful caller will unlikely attract the bird in the next successive days with that same model. The bird will shy from that "voice." Also it is common practice for turkey callers to carry several calls with them because a turkey may ignore several "voices" before responding to a particular "voice." What is needed is an improvement which overcomes the shortcomings of the prior art and provides a caller with more versatility in the field for varying the tone, pitch or resonance of his or her call device.

According to one aspect of the invention, a wooden box call is modified to carry a strike plate on a face of the lid/actuator that is opposite the lid's conventional convex face. The foregoing modification combines a box call and strike plate in one assembly. The strike plate allows use with conventional pegs or "reeds," i.e., by which scraping the reed on the strike plate produces a mimic turkey call, and one which is different from the mimic turkey call obtainable from the box call when used conventionally. As a preliminary matter, the meaning of "reed" as used here includes elastic members like a fiberglass peg or the like which produce sound when vibrated vis-a-vis scraping on a friction surface and so on.

According to an alternate aspect of the invention, the reed or peg can be given a threaded end and then be screwed into the bottom of the box call such that flipping the lid/actuator allows alternate use between the conventional way that a box call is used, and, the inventive way of the fixed peg and strike plate combination.

According to an additional aspect of the invention, more than one peg or reed can be screwed into the bottom of the box call in order to get resonance between the reeds. Moreover, pegs or reeds can be added and subtracted as desired to obtain the desired resonance sought after.

The foregoing aspect can also be achieved alternatively by a stand-alone base block to which two (or more) reeds are attached or connected by screw thread, and which produce as a result a richer sound than one reed alone. It is believed that the dual reeds in accordance with the invention resonate against each other in much the same fashion as tines of a tuning fork, and perhaps thereby produce comparable resonating tones.

According to a further aspect of the invention, a peg or reed as just mentioned, which has screw thread formed on a portion of it, can be screwed to its respective base and adjusted to change its free length to become relatively longer or shorter. That way, a user can tune the pitch of the reed by twisting it in deeper in its socket or backing it out slightly in order to change its free length.

According to still other aspects of the invention, the box call can be tuned by provision and use of varius vibration dampers which are configured to have opposite arms that are rested against and dampen the sidewalls or sounding boards of the box call. The foregoing also allows tuning, and achieves some change in the pitch of the peg, too.

A number of additional aspects and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a box-type turkey call in accordance with the invention, wherein a changed position for a lid thereof is shown in dashed lines;

FIG. 2 is a perspective view of the lid, generally comparable to FIG. 1 except from a relatively changed vantage point and with portions of the box base broken away, wherein direction arrows are included to show an axis about which the lid can spin relative to the box base;

FIGS. 3a and 3b are a pair of views which together illustrate one manner of use of the inventive turkey call, however this manner of use is otherwise conventional, and it includes back and forth strokes of the lid relative the box base, wherein:

FIG. 3a is a reduced scale plan view, and,

FIG. 3b is an enlarged scale, partial section view taken through line 3b—3b in FIG. 3a;

FIGS. 4a and 4b are a pair of views comparable to FIGS. 3a and 3b except illustrating another, and in this instance inventive manner of use of the inventive turkey call in which the lid has been spun a half turn to orient its opposite side for use, wherein:

FIG. 4a is a plan view, and,

FIG. 4b is an enlarged scale, partial section view taken through line 4b—4b in FIG. 4a;

FIGS. 5a and 5b are comparable perspective views of an accessory turkey call in accordance with the invention, wherein:

FIG. 5a shows complete assembly, and,

FIG. 5b shows partial disassembly;

FIG. 8 is a perspective view of another accessory in accordance with the invention, for conventional box-type turkey calls;

FIG. 9 is a plan view of the FIG. 8 accessory, as shown installed in a box base of a given box-type turkey call to illustrate how to use the accessory to vary the pitch of the turkey call; and, FIG. 10 is a perspective view of an additional accessory in accordance with the invention, for conventional box-type turkey calls, as shown installed on a box base of a given box-type turkey call to illustrate how to use this accessory to vary the pitch of the turkey call.

DETAILED DESCRIPTION OF THE PREFERRED EMBODIMENTS

Figure 5A:
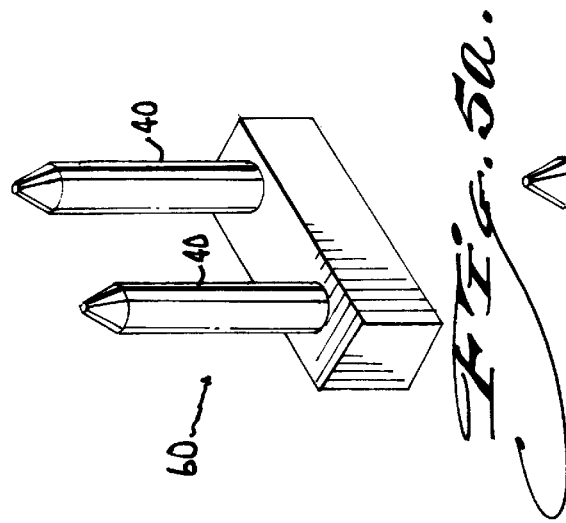

In FIG. 1, a box-type turkey 20 call in accordance with the invention comprises a generally rectangular, elongated upwardly open wooden box assembly including a base 22 and an attached actuator top or lid 24. The box base 22 is wooden and has open box-shape formed by a bottom wall 30 carrying opposed sidewalls 32 and 34 spaced by opposite end pieces 36. One side wall 32 is conventional and has a conventional upper curved or convex edge 38 exposed for strokes or scraping against it by the lid 24. An inventive aspect of the box base 22 relates to inclined reeds or pegs 40 that are anchored in the bottom wall 30 to extend laterally out and away from their respective points of origin in the bottom wall 30 (their origin in the bottom wall 30 not in view in FIG. 1), to terminate in pointed tip or scrape ends. Three pegs 40 are shown by the drawing figures, however a user could remove one or more of the pegs 40 from the box 20 because they are inserted by screw thread, and thus get by with two or one of the pegs 40. Also, more pegs 40 than three could be added by forming further threaded sockets for them in the base 22 and screwing them in, although this is not shown.

Whereas the pegs 40 can be wooden too, the pegs 40 preferably are made from other suitable materials including without limitation fiberglass as well as Plexiglas™ (e.g., a popular brand of an acrylic plastic) or like polymer or moldable resinous materials. The side wall 34 opposite the conventional wall is notched to allow the pegs 40 to protrude as shown.

The lid 24 is double-sided or -faced. FIGS. 3b and 4b show that one side or face 42 of the lid is conventional and is rounded or convex for rubbing or scraping against the convex edge 38 of the conventional sidewall 32 (i.e., see FIG. 3b). The opposite side of the lid 24 has a plate 44 of flat hard material, i.e., a striking plate or "strike-plate," fastened to it (see FIGS. 1, 3b and/or 4b). The material for the strike-plate 44 can be chosen from a group that includes without limitation such materials as slate, tempered glass, Pyrex™ glass or aluminum and so on. The lid 24 is fastened to the end piece 36 by a small hinge 46 which pivots on a screw 48 with a compressed coil spring 52 between the end piece 36 and hinge 46. The screw 48 is anchored into the end piece 36 and located either centered between the sidewalls as shown, or, alternatively, off-center (not shown). Given the foregoing, the lid 24 can pivot via the hinge 46 as shown by FIG. 1, or be flipped to spin about the screw 48 as shown by FIG. 2, so that, as a result, the lid 24 can be turned or "flipped" over for orienting one side or the other alternatively to the sidewall edge 38, or to the pegs 40, without detaching the lid 24 to do so.

FIGS. 3a and 3b show that the turkey call 20 in accordance with the invention allows conventional use via strokes or scrapes of the conventional convex face 42 of the lid 24 against the conventional convex sidewall edge 38, to produce sounds preferably simulative of turkey noises. In use, the conventional face 42 of the lid 24 is coated with chalk (chalk not shown) to eliminate slip or promote frictional grabbing between the chalk-coated face 42 and conventional sidewall edge 38. Experience with the modified lid 24 as shown by FIGS. 3a and 3b (i.e., modified as compared to a conventional lid without the strike-plate 44) has taught that the pitch changed depending on if the strike-plate 44 was attached or not. If the strike plate 44 is attached, the pitch is relatively lower. The changing pitch has been attributed to the relatively increased mass of the lid 24 while the strike-plate 44 is affixed to it.

A problem with conventional box-type turkey calls has been that, in wet outdoor weather, dampness often seeps into the chalk regardless of what care is taken to keep the turkey call dry. The ability to produce quality turkey calls is drastically reduced if not lost after the chalk-coated face picks up too much dampness.

An inventive aspect of the FIG. 1 turkey call 20 relates to the side of the lid 24 opposite the conventional side 42, the one that carries the strike-plate 44. The lid 24, because it is attached to the end piece 36 via the hinge and screw arrangement 46 and 48, can be turned over for orienting the strike-plate 44 for use against the scrape ends of the reeds or pegs 40, as shown by FIGS. 4a and 4b, without detaching the lid 24 from the end piece 36.

The pegs 40 are formed with threads at one end (not in view in FIG. 4b) for tightening the pegs 40 into threaded sockets (not shown) in the bottom wall 30 of the box base 22. The bottom wall 30 of the box base 22 in accordance with the invention has been modified to give it more thickness than is conventional. The bottom wall 30 includes an attached subbase 54 so that, together, the bottom wall and subbase 30 and 54 have sufficient thickness to support the pegs 40 in the threaded sockets, and in opposition to forceful strokes of the lid 24. Stroking the strike-plate 44 across the pegs 40 allows a user to produce sounds simulative of turkey yelps, purrs, clucks and so on.

Further advantages of the system of pegs and strike-plate 40 and 44 include the following. The sound quality given by the pegs and strike-plate 40 and 44 remains relatively the same if damp or dry (as long as the pegs 40 are not wooden). The number of pegs 40 in use can be varied between one and three (or up to however many the bottom wall 30 is adapted to carry). One peg gives off a relatively purer tone than two or more pegs. In contrast, two or more pegs give off multiple tones and more resonance.

The traditional materials for peg and strike-plate calls have been wooden pegs and slate strike-plates. In traditional use, a wooden peg was dragged across a slate strike-plate. To the ears of some users, however, wood on slate fails to give off a correct-sounding squall. Also, wood on slate is susceptible to problems if damp.

In accordance with the invention, the strike-plate 44 is dragged across the stationary pegs 40, rather than the other way around as was traditional. Preferably, the pegs 40 are made from a suitable polymer or moldable resinous material and, even more preferably, Plexiglas™ or fiberglass. The effectiveness of either Plexiglas™ or fiberglass is relatively unaffected by dampness. Whereas the strike-plate 44 may satisfactorily be made from slate, Pyrex™ or tempered glass is preferred because these materials are less susceptible to erosion or groove-forming after many strokes against the pegs 40. If the strike-plate 44 is made from Pyrex™ or tempered glass, the glass surface has to be properly prepared for use as a strike-plate. Generally, this involves scoring the surface of the glass to form in it miniature transverse grooves. Scoring can be accomplished via polishing with Emory cloth or by any other suitable means.

With general reference to FIGS. 4a and 4b, a user can vary the angle of attack of the strike-plate 44 relative the pegs 40, at least within limits. The preferred angle of attack to give the best sound quality varies with material of the strike pate 44 as well as the material of the pegs 40. During initial design of a prototype turkey call in accordance with the invention, the angle at which the pegs 40 are inclined relative the bottom wall 30 is arrived at by trial and error for any given combination of materials until the desired sound is achieved. The alignment given by FIG. 4b is representative of a combination of Plexiglas™ pegs 40 with a Pyrex™ glass strike-plate 44.

The choice of materials also varies the tolerance for error in accurately finding the preferred angle of attack. A strike-plate of slate, when compared to scored Pyrex™ or tempered glass, is a more forgiving material in terms of angle of attack, and allows the user to get desirable performance through a relatively greater range of angular alignments. Pyrex™ and tempered glass, in contrast, require more accurate alignment. Misalignment occurs at much less a deviation from any optimum angle of attack. An improper angle of attack generally causes problems with ineffectual sound production. More simply, it just won't work if the angle is improper. However, a user typically solves the problem, whether with slate or glass, through trial and error by ear, varying the angle of attack by hand. FIG. 4b also shows that the pegs 40 are preferably spaced sufficiently away from the adjacent sidewall 34 so they do not touch, as this deadens the sound, and/or raises the pitch because of the acoustical shortening of the pegs. Put differently, this works something like "noting" a guitar.

Figure 5B:
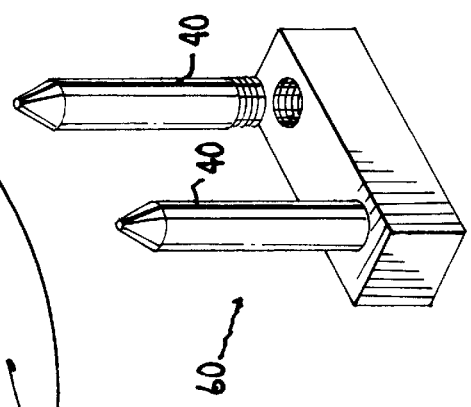

FIGS. 5a and 5b show an accessory 60 in accordance with the invention to accompany the box-type turkey call 20 in FIG. 1. The accessory 60 is hand-held striker to rub against the strike-plate 44 on the lid 24 of the FIG. 1 turkey call 20 (this rubbing is not shown). The hand-held striker 60 comprises a bracket or base fixture formed with threaded sockets and a pair of pegs 40 which optionally might be two of the three pegs 40 shown in FIG. 1 removed for tightening into the bracket fixture shown by FIG. 5a. In FIG. 5b, the hand-held striker 60 is shown in a condition of partial disassembly. In use, a user grasps the lid 24 of FIG. 1 turkey call 20 in one hand and holds it relatively stationary (not shown). The user then rubs the pegs 40 in the hand-held striker 60 of FIG. 5a against the relatively stationary strike-plate 44 (not shown). It is believed that the hand-held striker 60 as shown produces sound the same way that a tuning fork does: i.e., the pegs resonate or vibrate opposite each other on about the same frequency. The advantage of the hand-held striker 60 is that it gives a user another tool to produce mimic calls having resonance as well as variety in sounds and/or pitches to attract turkeys.

Figure 6:
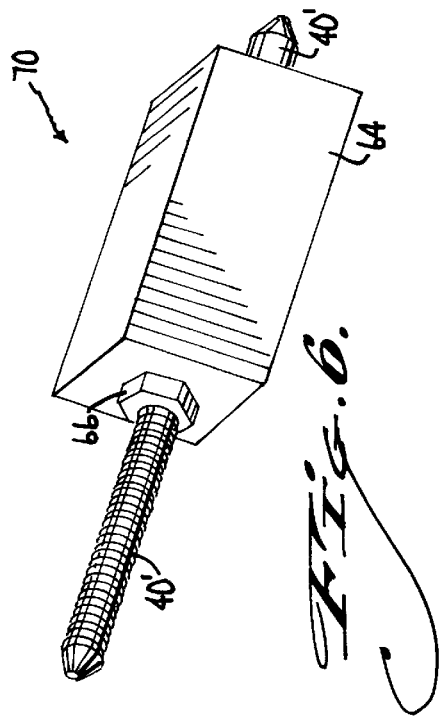
FIG. 6 is a perspective view of an alternate embodiment of an accessory turkey call in accordance with the invention.
Figure 7:
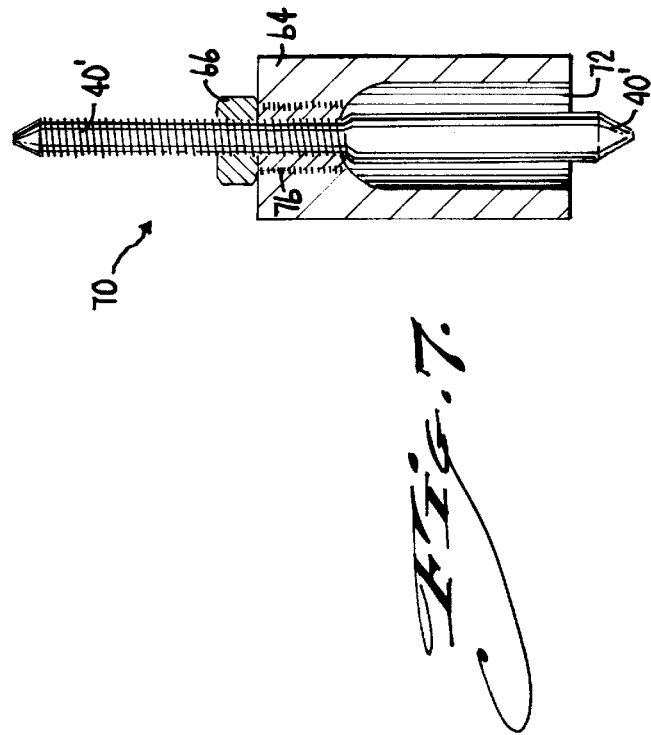
FIG. 7 is partial section view taken through an axis of symmetry through the FIG. 6 turkey call.

Turning back to FIG. 1, the lid 24 of the turkey call 20 extends away from the hinge 46 to terminate in a threaded stud 62 that carries a knob 64 locked in position by a common nut (not in view). FIGS. 6 and 7 show that this knob and nut 64 and 66 are removable and, in combination with a removed one of the pegs 40/40' from the FIG. 1 turkey call, can be assembled as shown to form an alternate hand-held striker 70 in accordance with the invention.

FIGS. 6 and 7 show, however, a different version of a peg 40' from the ones shown by FIG. 1. The FIGS. 6 and 7 peg 40' is relatively longer, and substantially more of it is formed with external threads. In FIG. 7, the knob 64 has formed in it on its central axis a counterbore portion 72 (i.e., the lower portion as the knob is oriented in FIG. 7) defining a sound chamber for the knob 64 for surrounding without touching portions of the peg 40', and a separate portion (i.e., the relatively upper portion as the knob is oriented in FIG. 7) formed with internal thread. The peg 40' is assembled to the knob 64 by inserting its threaded end first into the sound chamber 72, and then screwing the peg 40' optionally until positioned as shown. To complete the assembly, the nut 66 is twisted on the projecting threads of the peg 40' until tight against the knob 64. When complete, the pointed end of the peg 40' extends out from the sound chamber 72 as shown. The completed assembly forms a hand-held striker 70 that can be rubbed against the strike-plate 44 on the lid 24 as was described above in reference to the FIGS. 5a and 5b hand-held striker 60 (although this is not shown with either version of hand-held strikers 60 or 70). Various inventive aspects of the FIGS. 6 and 7 striker 70 include the following.

The pitch given by the peg 40' is adjustable (i.e., tunable) because adjusting the position of the peg 40' in the knob 64 between an extreme retracted position (i.e., as shown in FIG. 7) and an extreme extended position (not shown) changes the relative pitch given by the peg 40'. The advantage of adjustability includes eliminating the need to carry a variety of pegs to get a variety of pitches, regardless whether the pegs be of different sizes or material. A user only need carry the one peg 40' in accordance with the invention. A user can quickly experiment with the peg 40' in different positions of extension and retraction by twisting the peg 40' a little, tightening the nut 66, rubbing the strike-plate 44, and then, depending if the user gets the desired pitch or not, locking the peg 40' in place with the lock nut 66 twisted more completely tight or else continue adjusting.

The knob 64 is preferably wooden. The knob 64 in effect behaves as a vibration damper and resonator. Experimentation has determined that a walnut knob gives a relatively lower pitch than oak, but walnut requires a steel sleeve 76 and oak does not (the absence of a sleeve 76 is not shown) because walnut is not sufficiently strong when directly formed with internal thread to adequately support the peg. Still, for some users, the tone given by a walnut knob will be preferred over an oak knob's such that the added cost of manufacture to include a steel sleeve may justify itself.

FIGS. 8 through 10 depict various accessories in accordance with the invention for tuning a conventional box-type turkey call B. FIGS. 8 and 9 show an internal vibration damper and/or tuner 80 in accordance with the invention. In FIG. 8, the tuner 80 comprises a central body 82 and a pair of opposite arms 84 attached to the central body 82 at inner ends by pivot pins. Opposite the inner ends are outer ends which are biased to flare out away from the central body 82 by miniature compression springs 86. The outer ends also carry small resilient pads 88. These pads 88 are optional and not especially necessary (although their removal is not shown by the drawing figures). These pegs 88 can be formed from such materials as sticky-backed weather stripping or the like, and are provided for deforming against the sidewalls W of the turkey call box B in use (shown and explained below in reference to FIG. 9). The compression springs 86 have opposite ends resting inside complementary sockets in the arms 84 and central body 82 (not in view). The central body 82 includes a pair of miniature machine screws to lock in place the ends of the springs 86 that rest inside the central body 82.

FIG. 9 shows the use of the internal tuner 80 in accordance with the invention. Also shown is a given conventional box base B of a box-type turkey call to illustrate the operative environment for the internal tuner 80. The box base B includes opposed sidewalls W of which one is a high side and the other a low side, which correspond to producing low pitches (from the low (long) side) for simulating gobbler noises and high pitches (from the high (short) side) for simulating hen noises. Insertion of the internal tuner 80 as shown results in the arms 84 spread out between the spaced side walls W and the arms 84 (not in view) compressed. Insertion of the tuner 80 in any position in the box B causes the pitch of either sidewall W to become relatively higher. The low-pitch limit for a given sidewall will be the condition when the tuner 80 is removed from the box B. The high-pitch limit that can be obtained by a single tuner 80 is, when the tuner 80 is positioned at the center between the opposite ends, such that the tuner 80 partitions the box B into equal halves. Moving the tuner 80 off-center to or away one end or the other results in a relatively lower pitch (i.e., when compared to the center position). Higher pitches can be obtained by use of another like tuner (not shown) in combination with the original, wherein the highest pitch obtainable with two tuners 80 is likely achieved when the tuners 80 are position partitioning the box B into equal thirds.

FIG. 10 shows an alternate tuner 90 in accordance with the invention, which acts on the box B from the outside. This external tuner 90 is configured much like a binder clip found in office supply and stationery stores for clasping together a stack of papers. The external tuner 90 includes a U-shaped body 92 made of spring steel or the like which is flexed open by pivotal lever arms 94 if pinched together by a user. The U-shaped body 92 carries resilient pads 96 on its opposite edges for resting against the outside of the spaced sidewalls W of the box B, as shown. In use, changing the relative position of the external tuner 90 between the ends of the box B varies the pitch of either sidewall W as was described above in reference to the FIGS. 8 and 9 tuner 80, except that point of contact on the sidewalls W occurs on the outside of the box B and not in the inside.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A combination box call and separate handheld striker, the box call including an auxiliary scraping surface for use with the separate handheld striker, the combination comprising:
   the handheld striker, having a scrape end and being shaped and arranged for manipulation by a dominant hand of a user; and,
   the box call, comprising a generally rectangular, elongated upwardly open wooden box assembly, including:
      a longitudinally extending bottom wall;
      laterally spaced generally vertical sidewalls attached at their lower ends to the bottom wall, at least one sidewall having a slightly convex upper edge;
      spaced end blocks attached to the bottom wall and interconnecting the sidewalls to form opposite ends for said box assembly and thereby form a sound chamber;
      a longitudinally extending wooden actuator top having generally opposite faces and a planform generally bounded by peripheral edges, the actuator top including a handle at one end, wherein one of the faces thereof is formed laterally convex for scraping against the at least one sidewall convex upper edge to produce some mimic turkey calls, the other of the faces thereof mounting an inserted flat strike plate for scraping thereagainst by the scrape end of said separate handheld striker also to allow production of other mimic turkey calls; and,
   pivoting means, interconnecting one end of the wooden box assembly with the end of the actuator top opposite the handle, for allowing relative pivoting between the actuator top and box assembly;
   the actuator top being configured for alternate call usages such as in one instance as a scrape, in which the user operates the actuator top relative the convex upper edge in the production of box-type calls, and as in an alternate other instance as a strike plate, in which the user holds the actuator top steady in his or her non-dominant hand for scraping the strike plate thereon with the striker held in his or her dominant hand in the production of striker-type calls.

2. The box call of claim 1, wherein the strike plate can be chosen from a group that includes such materials as slate, tempered glass, and aluminum.

3. The box call of claim 1, wherein pivoting means includes a screw in the end of the wooden box assembly inserted through an oversized hole in the actuator top.

4. A box call comprising a generally rectangular, elongated upwardly open wooden box assembly, including:
   a longitudinally extending bottom wall;
   laterally spaced generally vertical sidewalls attached at their lower ends to the bottom wall, at least one sidewall having a slightly convex upper edge;
   spaced end blocks attached to the bottom wall and interconnecting the sidewalls to form opposite ends for said box assembly and thereby form a sound chamber;
   at least one reed attached to the bottom wall and extending up to terminate in a scrape end, which scrape end is positioned mediate the end blocks as well as spaced from the at least one sidewall convex upper edge;
   a longitudinally extending wooden actuator top having generally opposite faces and a planform generally bounded by peripheral edges, the actuator top including a handle at one end, wherein one of the faces thereof is formed laterally convex for scraping against the at least one sidewall convex upper edge to produce mimic turkey calls, the other of the faces thereof carrying a strike plate for scraping against by the scape end the reed also to produce mimic turkey calls; and,
   pivoting/flipping means, interconnecting one end of the wooden box assembly with the end of the actuator top opposite the handle, for allowing relative pivoting between the actuator top and box assembly and for allowing flipping of the actuator top for alternate use between the convex face/convex edge combination and the striker face/reed scrape end combination.

5. The box call of claim 4, further comprising at least another reed adjacent the at least one reed to allow resonation thereamong.

6. The box call of claim 4, wherein the reed comprises a peg formed with external thread opposite its scrape end and the bottom wall has at least one threaded hole such that attachment of the peg to the bottom wall is accomplished by a threaded connection, and accordingly the peg is replaceable.

7. The box call of claim 4, wherein the reed is formed from a material chosen from a group including wood as well as fiberglass and acrylic plastic and like polymer or moldable resinous materials.

8. The box call of claim 4, wherein the pivoting/flipping means comprises a hinge attached to the actuator top and a screw in the end of the wooden box assembly inserted through an oversized hole in the hinge.

9. The box call of claim 4, wherein the strike plate can be chosen from a group that includes such materials as slate, tempered glass, and aluminum.

10. A combination box call and a vibration damper allowing box call tuning, the combination comprising:

a box call comprising a generally rectangular, elongated upwardly open wooden box assembly:—including, a longitudinally extending bottom wall; laterally spaced generally vertical sidewalls attached at their lower ends to the bottom wall, at least one sidewall having a slightly convex upper edge; spaced end blocks attached to the bottom wall and interconnecting the sidewalls to form opposite ends for said box assembly and thereby form a sound chamber; a longitudinally extending wooden actuator top having generally opposite faces and a planform generally bounded by peripheral edges, the actuator top including a handle at one end, wherein one of the faces thereof is formed laterally convex for scraping against the at least one sidewall convex upper edge to produce other mimic turkey calls; and, pivoting means, interconnecting one end of the wooden box assembly with the end of the actuator top opposite the handle, for allowing relative pivoting between the actuator top and box assembly; and, a vibration damper having a base portion, opposite arms movably attached to base portion for deflection between deployed and non-deployed extreme positions, and biasing means for normally biasing the arms to deflect toward the deployed extreme position; wherein, the arms have contact surfaces and are deflectable for deployment in which the contact surfaces are rested on the sidewalls of the box assembly and thereby dampen and hence change the call producible by the box call, and further, changing where the contact surfaces rest on the sidewalls allows tuning of the box call.

11. The combination of claim 10, wherein vibration damper is sized for insertion in the sound chamber of the box assembly and the arms are arranged such that the extremes of the deployed and non-deployed positions corresponds to extremes of extension and retraction respectively.

12. The combination of claim 10, wherein vibration damper is sized for external use on the box assembly and the arms are arranged such that the extremes of the deployed and non-deployed positions corresponds to extremes of retraction and extension respectively.

* * * * *